United States Patent [19]

Gardiner

[11] Patent Number: 5,240,985
[45] Date of Patent: Aug. 31, 1993

[54] ADDITIVE FOR INCREASING THE SURFACE ENERGY OF MOLDING AND EXTRUSION GRADE POLYETHYLENE

[75] Inventor: Eric S. Gardiner, Westtown, N.Y.

[73] Assignee: Arizona Chemical Company, Panama City, Fla.

[21] Appl. No.: 829,981

[22] Filed: Feb. 3, 1992

Related U.S. Application Data

[63] Continuation of Ser. No. 583,571, Sep. 14, 1990, abandoned, which is a continuation-in-part of Ser. No. 415,615, Oct. 2, 1989, Pat. No. 4,964,614.

[51] Int. Cl.⁵ ............................................. C08L 23/00
[52] U.S. Cl. .................................... 524/274; 524/293; 524/299; 524/311; 524/583
[58] Field of Search ............... 524/252, 254, 293, 299, 524/311, 274

[56] References Cited

U.S. PATENT DOCUMENTS

| 4,506,037 | 3/1985 | Suzuki et al. | 524/427 |
| 4,792,582 | 12/1988 | Hoefer et al. | 524/378 |

FOREIGN PATENT DOCUMENTS

| 1297340 | 5/1963 | Fed. Rep. of Germany | 524/378 |
| 52-5856 | 12/1977 | Japan | |
| 2070027 | 9/1981 | United Kingdom | 524/252 |
| 980744 | 3/1985 | United Kingdom | 524/368 |

*Primary Examiner*—John C. Bleutge
*Assistant Examiner*—Mark Sweet
*Attorney, Agent, or Firm*—Luedeka, Hodges, Neely & Graham

[57] ABSTRACT

A method is disclosed for increasing the surface energy of a surface of an organic polymeric material, particularly polyolefins. The method is comprised of blending from about 99.5% to about 90.0% by weight of the polymeric material with from about 0.5% to about 10.0% by weight of an amphiphile having the formula:

$$RA(CHR^2[CH_2]_nA^1)_mR^1$$

R and $R^1$ are selected from the group consisting of the alkyl, aryl, alkylaryl, acyl and arylacyl derivatives of an aliphatic or aliphatic/aromatic mono-acid with a molecular weight of from about 150 to about 500 daltons, A and $A^1$ are polar atoms or groups, $R^2$ is selected from the group consisting of H, $CH_3$ and $C_2H_5$, n is from 0 to 3 and m is from 2 to 20.

4 Claims, No Drawings

ADDITIVE FOR INCREASING THE SURFACE ENERGY OF MOLDING AND EXTRUSION GRADE POLYETHYLENE

This is a continuation of U.S. application Ser. No. 07/583,571, filed Sept. 14, 1990 now abandoned, which is a continuation-in-part of U.S. application Ser. No. 07/415,615, filed Oct. 2, 1989 now U.S. Pat. No. 4,964,614.

The present invention relates to methods for increasing the surface energy of low or medium density organic polymeric materials, particularly polyolefins.

Low density polyethylene (LDPE) and other low and medium density polyolefins such as polypropylene, alpha-olefin modified polypropylene, polystyrene, TPX, i.e. poly(4- methylpentene-1), and other organic polymeric materials are used in high volume applications in the packaging industry in the form of injection molded parts, free extruded films and extrusion coatings on substrates such as paper, metal foils or non-woven fabrics. As such, it is often desirable to print or coat an exterior polymeric surface to enhance visual appeal, list ingredients, advertise, or protect the surface. There is also interest in using films of low and medium density polyolefins with acrylic based adhesives to produce adhesive tapes.

Because of the inherent low surface energy of these polymeric materials, the surface must be modified, that is made more polar, in order to accept most printing ink and coating or adhesive formulations. The current industry practice for surface modification of these materials is to oxidize the surface through flame or corona discharge treatment. Either of these treatments produces an acceptable surface, raising the surface energy from about 28 to about 42 dynes/cm$^2$. However, the effect is transient and surfaces that reside too long between treatment and printing or coating (i.e., greater than about four weeks) must be retreated for successful application.

It is, therefore, an object of the present invention to provide a method for increasing the surface energy of low and medium density organic polymeric material for relatively long periods of time.

In addition, it is an object of the present invention to provide low and medium density organic polymeric materials with increased surface energies which are stable for months.

In addition, this method produces a polymeric material whose surface inherently has a high surface energy and may be inventoried or used directly by the end-user without treatment just prior to use.

Further, it is an object of the present invention to provide a composition for increasing the surface energy of low and medium density organic polymeric materials.

The present invention provides a method for increasing the surface energy of a surface of a low or medium density, low surface energy organic polymeric material. The method is comprised of blending from about 99.5% to about 90.0% by weight of the polymeric material with from about 0.5% to about 10.0% by weight of an amphiphile having the formula

where R and R$^1$ are selected from the group consisting of the alkyl, aryl, alkylaryl, acyl and arylacyl derivatives of an aliphatic or aliphatic/aromatic mono-acid with a molecular weight of from about 150 to about 500 daltons, R$^2$ is selected from the group consisting of H, CH$_3$ and C$_2$H$_5$, A and A$^1$ are polar atoms or groups, m is from 2 to 20 and n is from 0 to 3. Examples of polar atoms or groups that are useful as A and A$^1$ include, but are not restricted to, O, S, —NR$^3$—or carboxyls. When A or A$^1$ is —NR$^3$—, R$^3$ is selected from the group consisting of H, CH$_3$ and C$_2$H$_5$. The value of n may be, but it is not necessarily, the same throughout the amphiphile. In preferred methods, the blending of the polymeric material with the amphiphile is accomplished by either melt blending, the blending of two solutions containing the polymer and the amphiphile, blending in a high shear mixer or adding the amphiphile as a solid or liquid to the polymeric material during extrusion. Alternatively, the amphiphile could be added to the polymer during work-up immediately after polymerization.

Examples of alkyl, aryl, alkylaryl, acyl and arylacyl derivatives of an aliphatic or aliphatic/aromatic mono-acid with molecular weights of from about 150 to about 500 daltons include, but are not restricted to, alkylbenzenes, aliphatic alcohols, acyl derivatives of saturated fatty acids having carbon atom chain lengths of from about 10 to 26 atoms, soya and tall oil fatty acids, alkylbenzoic acids and tall oil, wood and gum rosin acids.

The present invention also provides for a low or medium density polyolefinic composition with a high surface energy. The high surface energy does not decrease over a period of months. This is in contrast to corona discharge, as normally carried out, which produces a metastable oxidized high energy surface. After about 3 to 4 weeks the surface reverts to a lower surface energy. Consequently, printing and adhesive qualities rapidly deteriorate on storage. The composition is comprised of from about 99.5% to about 90.0% of a low or medium density, low surface energy polyolefin and from about 0.5% to about 10.0% by weight of the amphiphile described above. In a preferred composition R=R$^1$, R$^2$ is hydrogen, A=A$^1$=oxygen, m is 9 and n=1 and the composition is comprised of about 98% of the polyolefin and about 2% of the amphiphile. In another preferred composition R=R$^1$, R$^2$ is hydrogen, A=A$^1$=—NR$^3$—, R$^3$—hydrogen, m is 14, and n=1 and the composition is comprised of about 98% of the polyolefin and about 2% of the amphiphile. In yet another preferred composition, R=R$^1$, R$^2$ is hydrogen, A=A$^1$=carboxyl, m is 7, n=5 and the composition is comprised of about 98% of the polyolefin and about 2% of the amphiphile.

The present invention also provides for a composition for increasing the surface energy of a low or medium density, low surface energy organic polymeric material whereby the composition is added to the polymeric material. The composition has the formula:

where the composition is the amphiphile described previously.

The amphiphile disclosed in the present invention has a central hydrophilic component and two lipophilic components (represented by R and R$^1$ in the above formula) attached to either end of the central component. Without being bound by the theory, it is believed that the two lipophilic regions are most compatible with the organic polymeric material. Therefore, it is thought that the amphiphile is anchored in the polymeric material by those lipophilic portions. The hydrophilic portion comprising alternating organic and polar groups, in the middle of the amphiphile, is less compatible with the organic polymeric material. Therefore, it is also thought that the hydrophilic segment resides at the surface of the polymeric material. It is believed that this hydrophilic segment raises the surface energy of the polymeric material. Since the lipophilic segment of the amphiphile is anchored in the polymeric material, the surface energy of the polymeric material is increased on a more permanent basis than is possible using previous techniques.

The presence of a nitrogen in the central component provides an additional advantage over other polar components. The resulting amphiphile acts as an active hydrogen donor in addition to accepting hydrogen bonding. Therefore, it is possible to tailor the amphiphile for a specific use requiring hydrogen donation from a particular surface coating.

The amphiphile is generally formed by the reaction of, for example, polyglycols, polysulfides, polyimines or polyester diols with hydrophobes such as fatty acids, rosin acids, alkylphenols or aryl or aliphatic alcohols. The chain length of the hydrophilic segment, polyethylene glycol for example, varies from 2–20 units (where a unit is composed of 1, 2, 3 or 4 carbon atoms and one polar atom or group, for example, one oxygen, sulfur or nitrogen atom or carboxyl group) with a preferred length of about 10 units. The hydrophobes generally have chain lengths of from about 10 to about 26 atoms. The aromatic, aliphatic or mixed alcohols have molecular weights from about 150 to about 500 daltons.

There is a preferable limitation to the length of the hydrophilic portion of the amphiphile. At lengths of 2 units the addition of the amphiphile to the polymeric material does not significantly increase the surface energy of the material. At chain lengths of above 20 units, although there may be initial improvement in surface energy, the amphiphile leaches easily into aqueous liquids. This results in an eventual lowering of the surface energy of the polymeric material and consequently a loss in printability or suitability as a substrate for adhesive tape. In general, the optimum chain length is 10 units, although specific product usage may require greater or lesser chain lengths.

The increase in surface energy of the polymeric material is measured by the contact angle of water on the surface of the polymeric material. This contact angle is related to printability and suitability as a substrate for adhesive tape. Surface energy is also related to surface polarity and wettability and is extremely difficult to measure directly. Consequently, surface energy is normally measured indirectly by using liquids of known surface energy. When a match occurs, the liquid spreads rapidly over the surface. The surface energy of the surface is then equal to the surface energy of the liquid. More simply, the contact angle of a single substance, for example water, can be measured and the surface energy estimated. Generally, a required contact angle can be determined for the property desired. In the case of printing with normal inks, the water contact angle should be between about 60° to about 70°. In the case of acrylic based adhesives (applied as an aqueous dispersion), the water contact angle should be between about 50° about 70°. Untreated low density polyethylene, for example, shows a contact angle of 91'. The addition of between 0.5 and 10.0% of the amphiphile to the polymeric material results in contact angles between 70° and 30°.

In addition, it is preferable that the amphiphile concentration not exceed 10% by weight. At amphiphile addition amounts of greater than 10% there is an indication of significant phase separation between the amphiphile and the polymeric material. Once phase separation occurs, there is no improvement in printability or adhesion and little change in the surface energy.

The organic polymeric material is not restricted to low density polyethylene. Other low and medium density polyolefins such as polypropylene, alpha-olefin modified polyethylene and polypropylene, polystyrene, and TPX are also suitable for treatment with the amphiphile for raising their surface energies. These other polyolefins are blended with the amphiphile in the same manner as polyethylene.

In order to provide a more complete understanding of the invention, the following examples are offered by way of illustration and not by way of limitation.

EXAMPLE I

A series of amphiphiles were prepared by the esterification of carboxylic acids. These materials were prepared by reacting a polyethylene glycol of the indicated molecular weight with a slight excess over two equivalent weights of the chosen acids under the indicated conditions shown in Table I. The amphiphiles were produced in a reactor arranged for nitrogen blanketing and stirring with an exit condenser to condense removed water. An acidic catalyst was employed for convenience. Table I summarizes reaction conditions and the amphiphiles produced.

TABLE I

SYNTHESIS OF AMPHIPHILE A-1

| CARBOXYLIC ACID | | PEG[8] | | CATALYST | | REACTION CONDITIONS | | AMPHIPHILE PRODUCED | | | | |
|---|---|---|---|---|---|---|---|---|---|---|---|---|
| Type | Wt. g. | Mol. Wt. | Wt. g. | Type | Wt. g. | Time Hours | T. C | # | Acid No. | Color Gardner | Yield %[11] | State |
| TORA[1] | 520 | 150 | 112 | H$_3$PO$_4$ | 0.4 | 29 | 280 | A | 11 | 7 | 89 | Viscous Liquid |
| TORA[1] | 520 | 165 | 150 | H$_3$PO$_2$ | 0.6 | 32 | 260 | B | 12 | 6 | 92 | Viscous Liquid |
| TORA[1] | 520 | 400 | 300 | H$_3$PO$_2$ | 0.6 | 29 | 260 | C | 11 | 7 | 94 | Viscous Liquid |
| WOOD[2] ROSIN | 543 | 400 | 300 | H$_2$SO$_4$ | 0.2 | 39 | 270 | D | 11 | 8 | 88 | Viscous Liquid |
| GUM[3] ROSIN | 506 | 400 | 300 | H$_3$PO$_2$ | 0.6 | 25 | 270 | E | 12 | 6 | 93 | Viscous Liquid |
| DIST.[4] TORA | 482 | 400 | 300 | H$_3$PO$_2$ | 0.6 | 28 | 270 | F | 3 | 4 | 90 | Viscous Liquid |
| STEARIC[5] | 350 | 400 | 249 | PTSA[9] | 0.5 | 20 | 220 | G | 4 | 2[10] | 98 | Waxy Solid |

TABLE I-continued

SYNTHESIS OF AMPHIPHILE A-I

| CARBOXYLIC ACID | | PEG[8] | | CATALYST | | REACTION CONDITIONS | | AMPHIPHILE PRODUCED | | | | |
|---|---|---|---|---|---|---|---|---|---|---|---|---|
| | | | | | | Time | | | | Color | | |
| Type | Wt. g. | Mol. Wt. | Wt. g. | Type | Wt. g. | Hours | T. C | # | Acid No. | Gardner | Yield %[11] | State |
| PALMITIC[6] | 406 | 400 | 300 | $H_3PO_2$ | 0.6 | 22 | 220 | H | 6 | 2[10] | 98 | Waxy Solid |
| TOFA[7] | 208 | 400 | 249 | $H_3PO_4$ | 0.3 | 22 | 220 | I | 12 | 2 | 98 | Liquid |

NOTES FOR TABLE I
[1]Acintol R Types S Tall Oil Rosin, Arizona Chemical Company
[2]W W Wood Rosin, Hercules
[3]Gum Rosin, Brazil
[4]Beviros 95 Distilled Tall Oil Rosin, Arizona Chemical Company
[5]Aldrich Chemical Co., 95% Pure
[6]Aldrich Chemical Co., 99% Pure
[7]Acintol EPG Tall Oil Fatty Acid, Arizona Chemical Company
[8]Linear Polyethylene Glycols of Carbowax Type Produced by Union Carbide at Various Molecular Weights
[9]Para-toluene sulfonic acid
[10]Molten Color
[11]As % of Theory

EXAMPLE II

A glass reactor, fitted with a condenser to collect condensate, a stirrer and arranged for nitrogen blanketing, was charged with 200 parts of branched 18 carbon fatty acids (Sylfat TM, Arizona Chemical Co., D-1 fatty acid, acid number 178), 100 g of polyethylene glycol (average molecular weight of 400, an average of 9.1 moles of ethylene oxide per chain) and 0.5 g of phosphorus acid. The reactor was blanketed with nitrogen, stirred, and the temperature raised to 200° C. and held at that temperature for seven hours. After completion of the reaction, the mixture was stripped under vacuum to remove the excess unreacted fatty acid. The resulting amphiphile, J, was produced in 82.5% yield, with a Gardner color of 5 and an acid number of 6.3. This amphiphile was a mobile liquid at room temperature.

EXAMPLE III

The general procedure of Example II was followed to produce amphiphile K. In this case, 40 g of nonylphenol ethylene oxide condensate (Igepal 710, GAF Corp., 10-11 mole of ethylene oxide condensate) was reacted with 21 g of tall oil rosin (AN 175) for 29 hours in the presence of 21 mg of hypophosphorus acid catalyst at 270° C. After completion of the reaction, the amphiphile K was analyzed by gel phase chromatography which indicated a purity of 89% with the major impurity excess rosin (about 10%). The amphiphile K was a viscous oil at room temperature with a Gardner color of 4 and an acid number of 15.

EXAMPLE IV

Amphiphile L was prepared as follows in a glass reactor fitted with stirrer, heater, nitrogen blanketing, and an exit condenser. Twenty grams of polyethylene glycol (molecular weight of 400) 18.6 g of methyl decanoate and 0.2 g of para-toluene sulfonic acid were charged to the reactor. The mixture was stirred and heated to 130° for 1 hour and then 160 for 1½ hours. The resulting amphiphile was analyzed by gel phase chromatography and determined to be about 98% pure in 100% yield. The amphiphile L had a Gardner color of 3, an acid number of 2 and was a mobile liquid at room temperature.

EXAMPLE V

A 251 g sample of Permapol ® P-3 Polyol (Thiokol), a mixed hydroxyl terminated oxygen-sulfur ether having a typical structure of

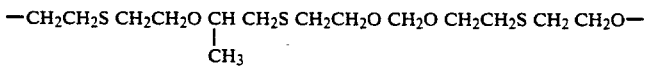

and a molecular weight of 500, was reacted with 350 g of tall oil rosin acid in the presence of 0.6g of 50% aqueous hypophosphous acid and was heated at 270° C. for four hours. The product, amphiphile M, was obtained in essentially quantative yield as a viscous amber oil with an acid number of 12.4.

EXAMPLE VI

A sodium dispersion was prepared in a Morton flask with 9.2 g of sodium dispersed in 250 ml of distilled tetrahydrofuran and mixed at 20° C. With continued stirring, a mixture of 22.5 g of polyethylene glycol 400 and 30.1 g of 1-bromohexadecane was added to the reaction mixture and the mixture was raised to reflux. After 48 hours, the sodium was removed by filtration and the tetrahydrofuran was evaporated from the reaction mixture. The crude amphiphile, bishexadecyl polyethylene glycol ether, was dissolved in ethyl ether. The ether solution was washed with water and then purified on a silica gel column to produce the purified amphiphile N. Amphiphile N was obtained as a viscous, pale yellow oil.

EXAMPLE VII

An organic polymeric composition with a high surface energy was prepared as follows. A low density polyethylene (Alathon ®, with 0.92-0.94 specific gravity, characterized by a melt index of 3.5-4.5 condition E ASTM Standard, produced by the DuPont Company; Tenite ® 1924, with 0.92-0.94 specific gravity, characterized by a melt index of 3.5-4.5 condition E ASTM Standard, produced by Eastman Kodak; or Dow Resin 5004, with 0.92-0.94 specific gravity, characterized by a melt index of 3.5-4.5 condition E ASTM Standard, produced by Dow Chemical Company) and the selected amphiphiles at various levels were combined together in melt form, by mixing in an extruder or by mixing in a high shear mixer. The means of compounding was not important so long as intimate mixing was accomplished. After compounding, the polymeric product was extruded as a film or was extruded as a film directly onto glass. The surface energy of the film was measured by determination of the contact angle. Table II details polymeric composition produced and the contact angles determined.

Amphiphile C was also master batched in an extruder. Polyethylene resin and the amphiphile were combined in an extruder and then extruded. The extrudate was chopped to make normal resin pellets. The master batch was then extruded onto metal, paper and as a free film. Contact angles determined on those substrates confirm the contact angles shown in Table II. These substrates have also been successfully printed in a plant trial seven weeks after a coated board was produced.

TABLE II

WATER[a] CONTACT ANGLES OF LDPE COMPOSITIONS

| AMPHI-PHILE 2% LEVEL | LDPE | WATER CONTACT ANGLE[b] | | |
|---|---|---|---|---|
| | | 2% BY WEIGHT | 5% BY WEIGHT | 10% BY WEIGHT |
| None | Tenite 1924 | 91 | — | — |
| A | Tenite 1924 | — | — | 75 |
| B | Tenite 1924 | — | 82 | 75 |
| C | Tenite 1924 | 71 | 57 | — |
| D | Alathon 1640 | — | 58 | — |
| E | Alathon 1640 | — | 56 | — |
| F | Alathon 1640 | 65 | 63 | — |
| G | Tenite 1924 | 49 | 57 | — |
| H | Alathon 1640 | 30 | 36 | — |
| I | Tenite 1924 | 31 | 25 | — |
| J | Alathon 1640 | 63 | 16 | — |
| K | Alathon 1640 | 62 | 53 | — |
| L | Alathon 1640 | 74 | 60 | — |
| M | Alathon 1640 | 69 | 70 | — |
| N | Alathon 1640 | 81 | 63 | — |

[a] Distilled water with 0.01% by weight aniline blue added for contrast
[b] Decreasing contact angle equals increased surface energy.

EXAMPLE VIII

Amphiphile C from Example I was composited with the polyolefin Alathon 1640 (DuPont) at 1, 2 and 5 weight percent as in Example VII. Water contact angles were determined and the results are listed in Table III. As may be seen in Table III, measurement of the contact angle is less reproducible as the concentration of the amphiphile is increased. This we speculate is related to the limited solubility of the amphiphile in the polyolefin.

TABLE III

| Weight Percent of Amphiphile | Water Contact Angle |
|---|---|
| 1 | 81 ± 4 |
| 2 | 71 ± 12 |
| 5 | 57 ± 12 |

EXAMPLE IX

Synthesis of an Amphiphilic Amide

Tall oil rosin was first converted to the rosin acid chloride which was reacted with the polyimine in a pyridine solution. The reaction mixture was maintained at between 0° C. to 2° C. for 2 hours and then slowly warmed to room temperature over 1 hour. The mixture was held at room temperature for 30 minutes. The product was coagulated by pouring the reaction mixture into a large excess of hexanes. The coagulated product was washed with hexane and redissolved in methanol. The methanol solution was transferred to another vessel and the methanol was removed by evaporation. Table IV details the amphiphiles produced.

TABLE IV

SYNTHESIS OF AMPHIPHILE O

| Carboxylic Acid | | | Polyimine Diamide | | | Amphiphile | | |
|---|---|---|---|---|---|---|---|---|
| | Wt | Mol. | | Wt | Mol | | Gardner | |
| Type[a] | (g) | Wt. | Type[b] | (g) | Wt. | # | Color | Yield |
| TORA | 25 | 302 | PEI | 24.7 | 600 | O | >18 | 70%[c] |

[a] TORA = tall oil resin acid;
[b] PEI = polyethylene imine.
[c] As determined by infrared and NMR Spectroscopy.

EXAMPLE X

Synthesis of Polyolefins with High Surface Energy

Low or medium density polyolefins were combined with selected amphiphiles, as shown in Table V, as melts or by solvent blending. The means of compounding was not important so long as intimate mixing was accomplished. After compounding, the polymeric product was extruded as a film or was extruded as a film directly onto glass. The surface energy of the film was measured by determination of the contact angle of water. Table V details polymeric compositions produced and the contact angles determined.

TABLE V

WATER[a] CONTACT ANGLES OF POLYOLEFIN COMPOSITIONS

| Amphiphile | Polyolefin[b] | Water Contact Angle[c] | |
|---|---|---|---|
| | | 2%[d] | 5%[d] |
| None | PS | 77 | — |
| O | PS | 70 | 70 |

[a] Distilled water with 0.01% by weight aniline blue added for contrast.
[b] PE = polyethylene; PP = polypropylene; PS = polystyrene.
[c] Decreasing contact angle equals increasing surface energy.
[d] Amphiphile, by weight, added to polyolefin.

EXAMPLE XI

Synthesis of Amphiphilic Polyesters

To prevent redistribution and transesterification during esterification, tall oil rosin was first converted to the rosin acid chloride. The acid chloride was reacted with a linear polyester diol, as shown in Table VI, in toluene at 90° C., with pyridine as an HCl scavenger. The product was decanted from over precipitated pyridinium hydrochloride, and the solvent removed by distillation. The product had the characteristics indicated in Table VI.

TABLE VI
SYNTHESIS OF AMPHIPHILE P

| Carboxylic Acid | | Polyester Diol | | | | Amphiphile | | |
|---|---|---|---|---|---|---|---|---|
| | | | | | | | Gardner | |
| Type[a] | Wt (g) | Type[b] | Wt (g) | Mol. Wt. | # | Acid No.[c] | Color | Yield |
| TORA | 50 | PCL | 44 | 630-912 | P | 25.6 | >18 | 86% |

[a]TORA = Tall Oil Rosin Acid;
[b]PCL = polycaprolactone;
[c]mg KOH/g amphiphile

EXAMPLE XII

Synthesis of Polyolefins With High Surface Energy

Low or medium density polyolefins were combined with selected amphiphiles, as shown in Table VII, as melts, by mixing in an extruder or by solvent blending. The means of compounding was not important so long as intimate mixing was accomplished. After compounding, the polymeric product was extruded as a film or was extruded as a film directly onto glass. The surface energy of the film was measured by determination of the contact angle of water. Table VII details polymeric compositions produced and contact angles determined.

TABLE VII
WATER[a] CONTACT ANGLES OF POLYOLEFIN COMPOSITIONS

| Amphiphile | Polyolefin[b] | Water Contact Angel[c] | |
|---|---|---|---|
| | | 1%[d] | 2%[d] |
| None | LDPE | 91 | — |
| None | PP | 82 | — |
| P | PP | 70 | 65 |
| P | LDPE | 78 | 75 |

[a]Distilled water with 0.01% by weight aniline blue added for contrast.
[b]LDPE = low density polyethylene; PP = polypropylene; PS = polystyrene.
[c]Decreasing contact angle equals increasing surface energy.
[d]Amphiphile, by weight, added to polyolefin.

From the foregoing, it may be seen that the addition of the amphiphile to a low density polyolefin greatly increases the surface energy of the low density polyolefin. Since printing and adhesion are most efficient at water contact angles of less than 70', the addition of the amphiphile greatly increases the usability of the polymeric material. The example also illustrates that the surface energy of the polymeric material can be raised to the desired level by the addition of the appropriate amount of amphiphile to the polymeric material.

This improvement in the surface energy of the polymeric material extends beyond low density polyethylene to a wide range of low and medium density polyolefins, including polypropylene, alpha-olefin modified polypropylene and polyethylene, polystyrene and TPX. In addition, the surface energy is improved for a period of time greater than 8 months as compared to prior treatments which were effective only for a period of four weeks or less. Therefore, the present invention provides for a means of increasing the surface energy of low and medium density organic polymeric materials for relatively long periods of time.

Various of the features of the invention which are believed to be new are set forth in the appended claims.

What is claimed is:

1. A low or medium density polyolefin composition comprising:
    from about 99.5% to about 90.0% by weight of a low or medium density, low surface energy polyolefin; and
    from about 0.5% to about 10.0% by weight of an amphiphile having the formula:

$RA(CHR^2[CH_2]_nA^1)_mR^1$ wherein R and $R^1$ are identical and are selected from the group consisting of the alkyl, aryl, alkylaryl, acyl, and arylacyl derivatives of an aliphatic or aliphatic/aromatic mono-acid with a molecular weight of from about 150 to about 500 Daltons, $R^2$ is hydrogen and A and $A^1$ are carboxyls, n is from 0 to 3 and m is from 2 to 60.

2. The composition of claim 1 wherein m is 9.

3. The composition of claim 1 wherein the polyolefin is polypropylene.

4. The composition of claim 3 wherein R and R' are rosin.